US012168271B2

(12) United States Patent
Hoeger

(10) Patent No.: US 12,168,271 B2
(45) Date of Patent: Dec. 17, 2024

(54) RECIPROCATING PREHEATING SYSTEM, METHOD, AND APPARATUS

(71) Applicant: Illinois Tool Works Inc., Glenview, IL (US)

(72) Inventor: Michael V. Hoeger, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 801 days.

(21) Appl. No.: 17/091,762

(22) Filed: Nov. 6, 2020

(65) Prior Publication Data

US 2022/0143733 A1 May 12, 2022

(51) Int. Cl.
| | |
|---|---|
| *B23K 9/167* | (2006.01) |
| *B23K 9/095* | (2006.01) |
| *B23K 9/10* | (2006.01) |
| *B23K 9/12* | (2006.01) |
| *B23K 9/173* | (2006.01) |

(52) U.S. Cl.
CPC ............ *B23K 9/167* (2013.01); *B23K 9/0953* (2013.01); *B23K 9/1093* (2013.01); *B23K 9/125* (2013.01); *B23K 9/1675* (2013.01); *B23K 9/173* (2013.01)

(58) Field of Classification Search
CPC ........ B23K 9/09; B23K 9/095; B23K 9/0956; B23K 9/10; B23K 9/1087; B23K 9/124; B23K 9/0953; B23K 9/173; B23K 9/125; B23K 9/167; B23K 9/1336; B23K 9/1675; B23K 9/1093
USPC .......................................................... 219/74
See application file for complete search history.

(56) References Cited

U.S. PATENT DOCUMENTS

| | | | |
|---|---|---|---|
| 8,653,417 B2 | 2/2014 | Peters | |
| 8,937,267 B2 | 1/2015 | Peters | |
| 8,946,596 B2 * | 2/2015 | Peters | B23K 9/091 |
| | | | 219/130.51 |
| 8,993,927 B2 | 3/2015 | Peters | |

(Continued)

FOREIGN PATENT DOCUMENTS

| | | |
|---|---|---|
| EP | 2872281 A1 | 5/2015 |
| EP | 3624980 A1 | 3/2020 |

(Continued)

OTHER PUBLICATIONS

The extended European search report for Application No. 21204052.1, dated Apr. 7, 2022, European Patent Office, Germany (9 pages).

*Primary Examiner* — Eric S Stapleton
(74) *Attorney, Agent, or Firm* — MCANDREWS HELD & MALLOY LTD.

(57) ABSTRACT

A welding system configured to eliminate effects of arc blow in a welding operation. The welding system comprises welding circuitry, preheat circuitry, a drive roller, and control circuitry configured to perform a reciprocation cycle. The reciprocation cycle may include the steps of: advancing a filler material toward the welding work piece until the filler material is electrically connected to the weld pool; supplying the preheat power to heat the filler material while the filler material is electrically connected to the weld pool; retracting the filler material away from the welding work piece until the filler material is not electrically connected to the weld pool; and terminating supply of the preheat power to the filler material while the filler material is not electrically connected to the weld pool.

15 Claims, 9 Drawing Sheets

(56) References Cited

U.S. PATENT DOCUMENTS

| | | | |
|---|---|---|---|
| 9,018,563 B2* | 4/2015 | Yamazaki | B23K 35/38 219/130.01 |
| 9,085,041 B2 | 7/2015 | Peters | |
| 9,193,004 B2 | 11/2015 | Enyedy et al. | |
| 9,238,274 B2 | 1/2016 | Cole | |
| 9,283,635 B2 | 3/2016 | Peters | |
| 9,415,458 B2 | 8/2016 | Doyle | |
| 9,498,838 B2 | 11/2016 | Peters | |
| 9,511,441 B2 | 12/2016 | Cole | |
| 9,833,862 B2 | 12/2017 | Denney | |
| 9,895,760 B2 | 2/2018 | Peters | |
| 9,937,580 B2 | 4/2018 | Peters | |
| 10,035,211 B2 | 7/2018 | Peters | |
| 10,046,410 B2 | 8/2018 | Peters | |
| 10,046,419 B2 | 8/2018 | Denney | |
| 10,086,461 B2 | 10/2018 | Peters | |
| 10,086,465 B2 | 10/2018 | Peters | |
| 10,399,172 B2 | 9/2019 | Cole | |
| 10,464,168 B2 | 11/2019 | Matthews | |
| 10,500,671 B2 | 12/2019 | Henry | |
| 2013/0020289 A1* | 1/2013 | Peters | B23K 26/342 219/121.11 |
| 2014/0263231 A1 | 9/2014 | Peters | |
| 2014/0263234 A1* | 9/2014 | Peters | B23K 9/173 219/130.1 |
| 2015/0028010 A1 | 1/2015 | Peters | |
| 2015/0090703 A1 | 4/2015 | Peters | |
| 2015/0151375 A1 | 6/2015 | Peters | |
| 2015/0158105 A1 | 6/2015 | Peters | |
| 2015/0158106 A1 | 6/2015 | Peters | |
| 2015/0158107 A1 | 6/2015 | Latessa | |
| 2015/0183044 A1 | 7/2015 | Peters | |
| 2015/0283639 A1* | 10/2015 | Henry | B23K 35/0294 219/130.51 |
| 2016/0175975 A1* | 6/2016 | Lattner | B23K 9/124 219/137 R |
| 2016/0221105 A1* | 8/2016 | Henry | B23K 9/173 |
| 2017/0334011 A1 | 11/2017 | Peters | |
| 2020/0215636 A1 | 7/2020 | Smith | |

FOREIGN PATENT DOCUMENTS

| | | |
|---|---|---|
| JP | S58209478 A | 12/1983 |
| JP | S59144581 A | 8/1984 |
| JP | H08309535 A | 11/1996 |
| WO | 2014013322 A2 | 1/2014 |

* cited by examiner

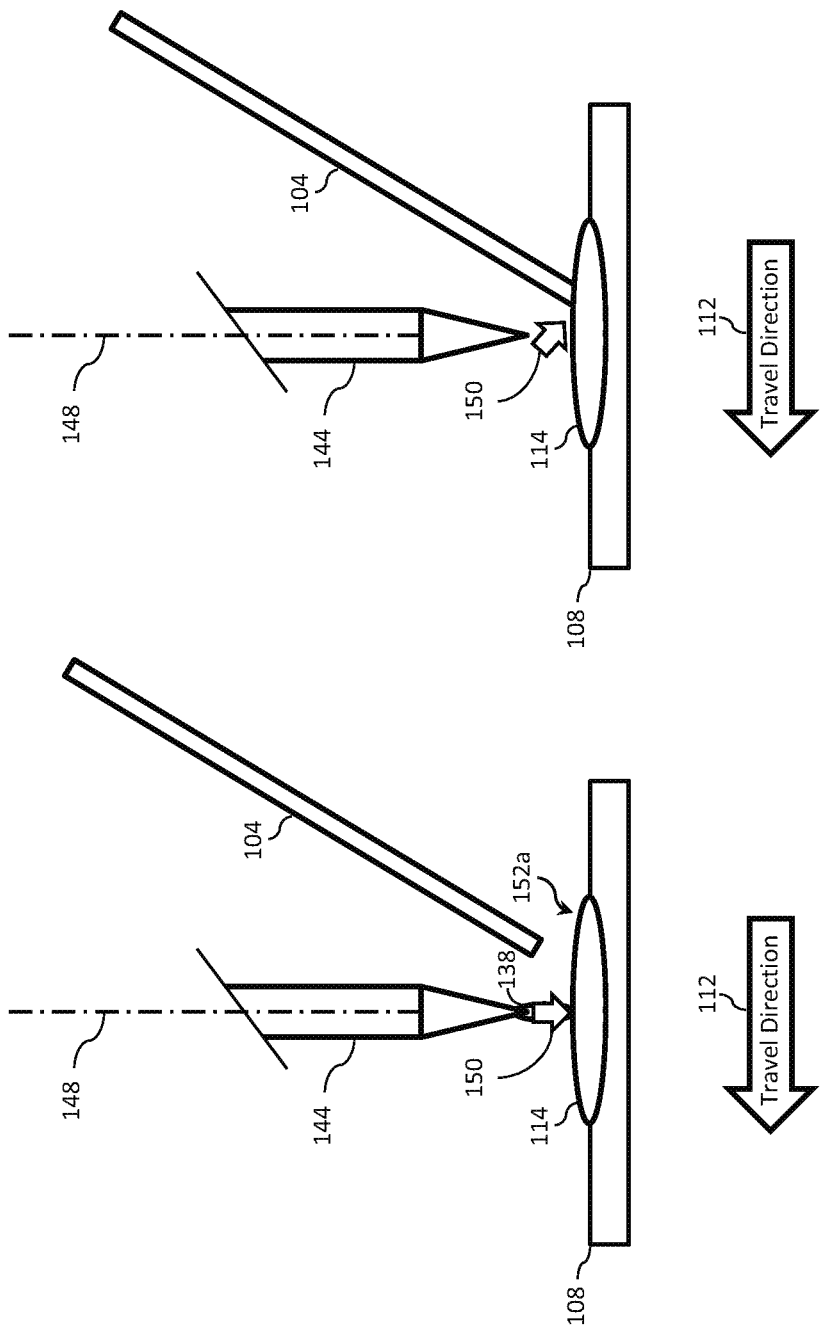

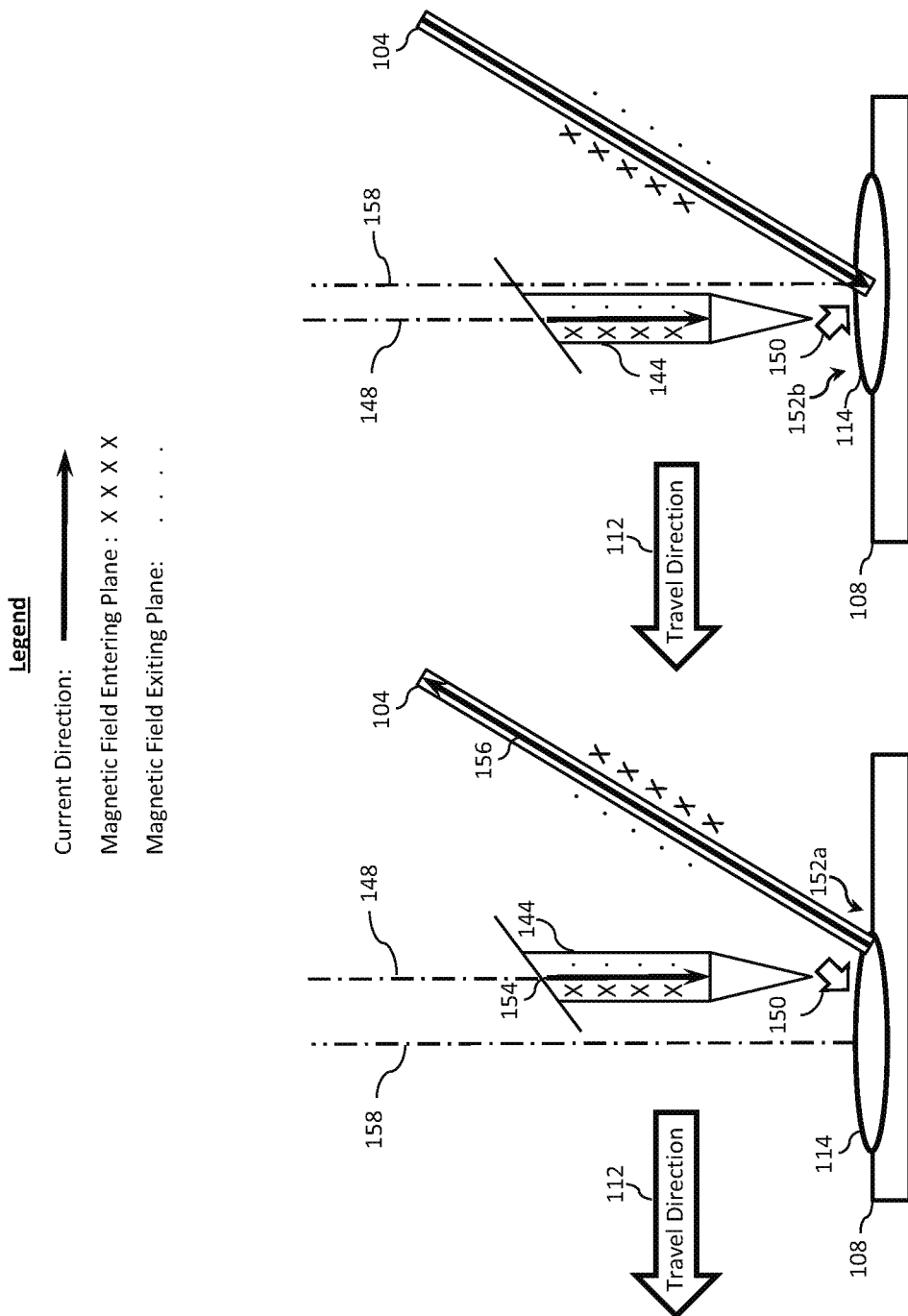

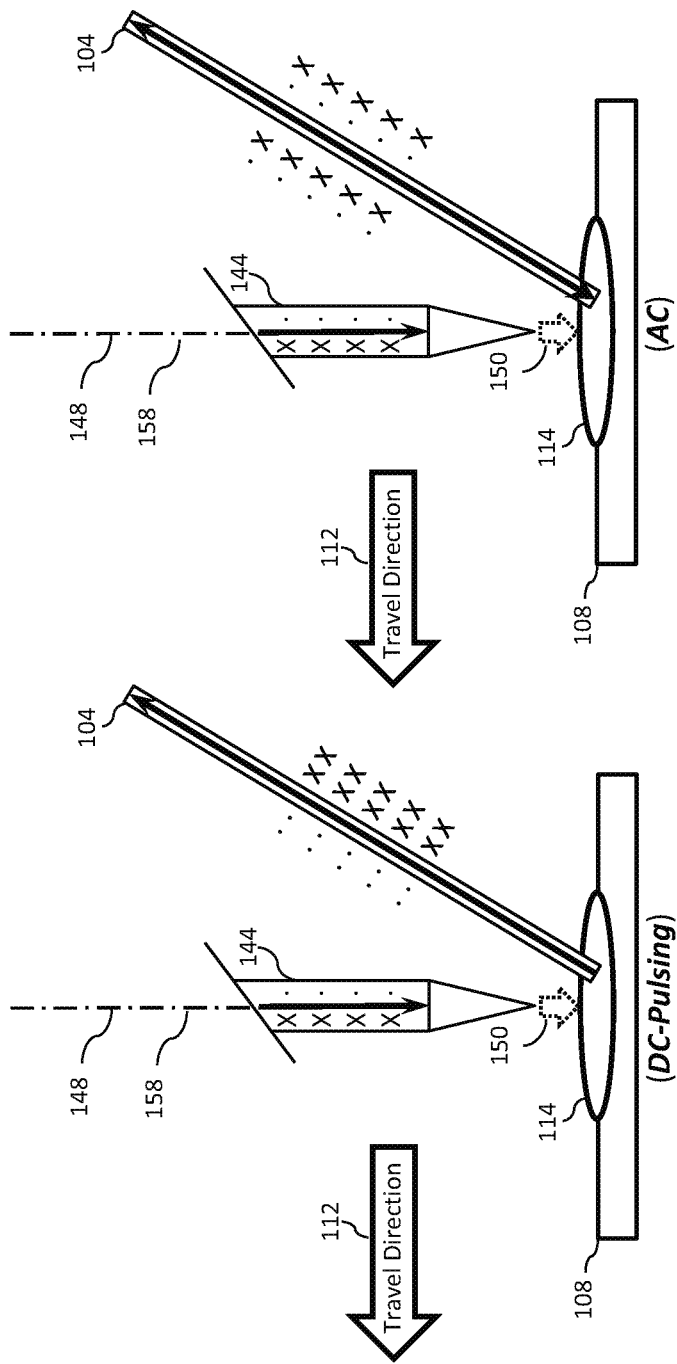

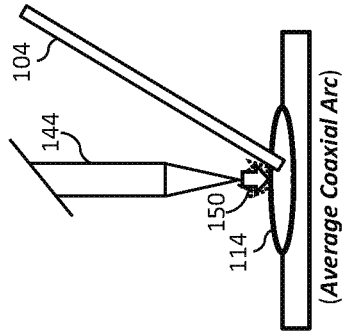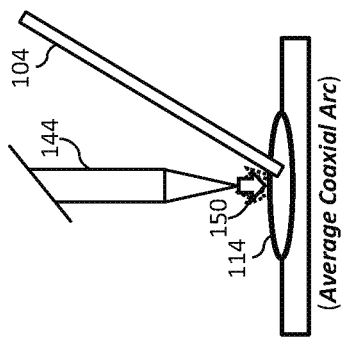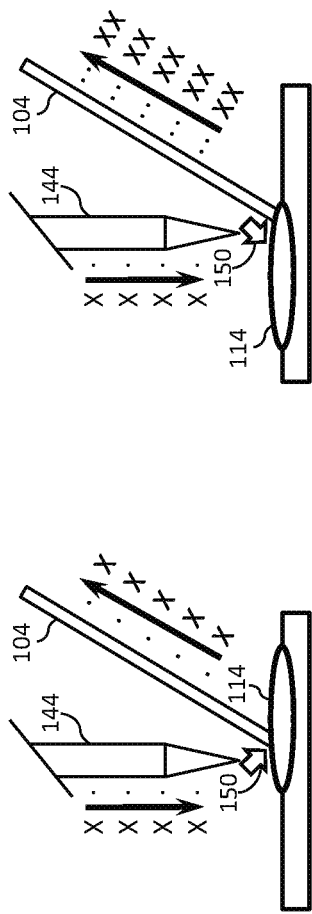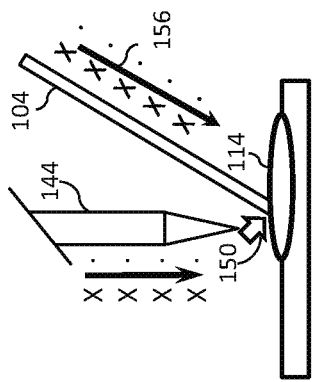

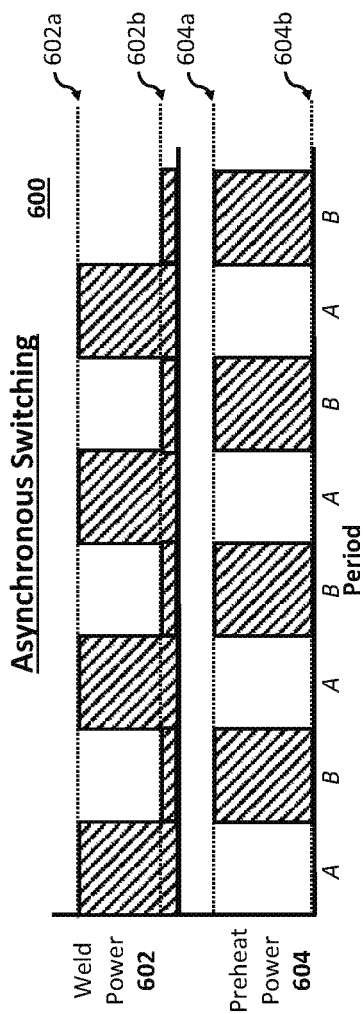
FIG. 6a
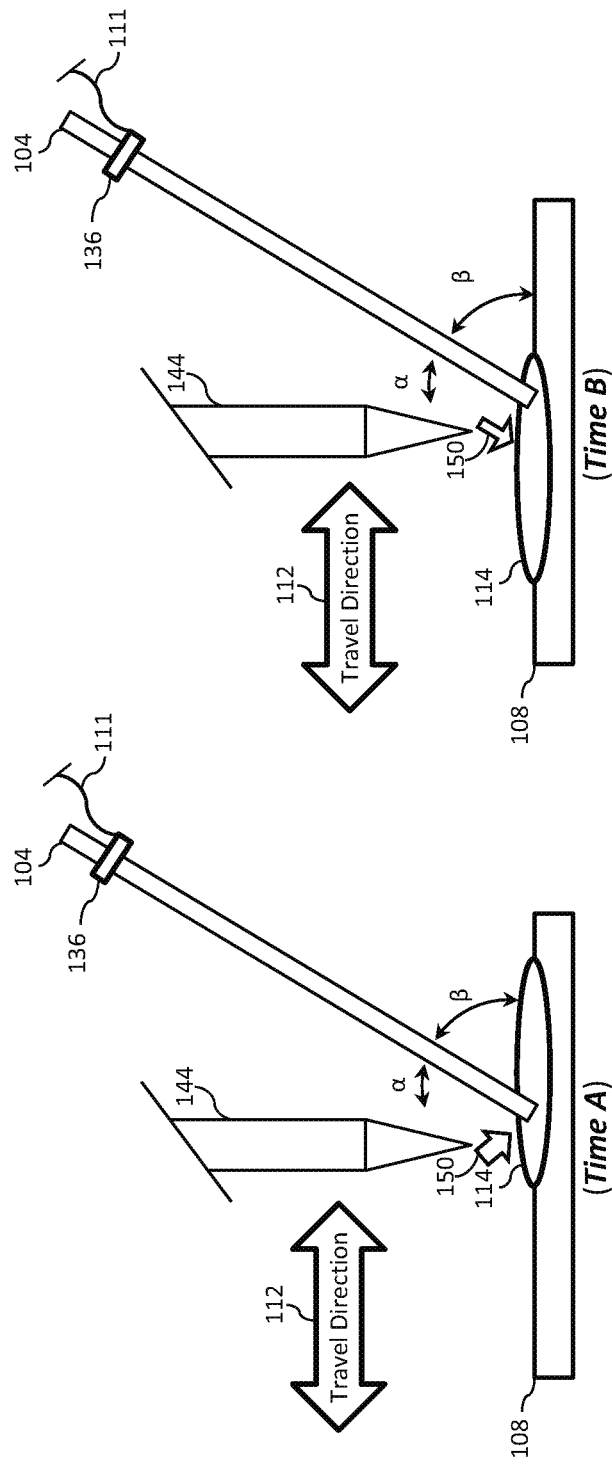
FIG. 6b
FIG. 6c

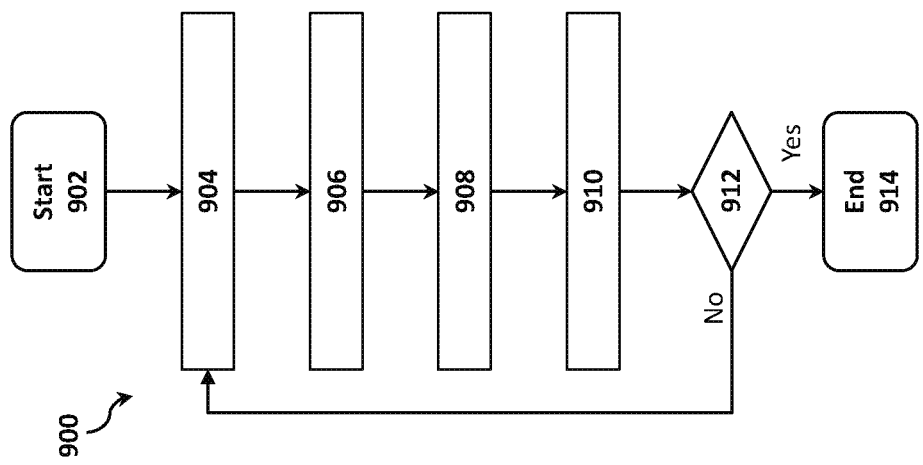

RECIPROCATING PREHEATING SYSTEM, METHOD, AND APPARATUS

BACKGROUND

This disclosure relates generally to welding processes involving preheating filler material, such as welding wire, and, more particularly, to methods and apparatus to preheat filler material to eliminate effects of arc blow.

Welding is a process that has increasingly become ubiquitous in all industries. Welding is, at its core, a way of bonding two pieces of metal or depositing additional metal to build up a surface. While a wide range of welding systems and welding control regimes have been implemented for various purposes, welding uses electrical power to sustain a welding arc that melts the filler material and the welding work piece to form the desired weld.

While welding is very effective in many applications, welding may experience different initial welding performance based upon whether the weld operation is started with an electrode or filler material that is "cold" or "hot." In general, a cold start refers to a welding operation where the electrode tip, filler material, and adjacent metals are at or relatively near the ambient temperature. Hot starts, by contrast, are typically those in which one or more of the electrode tip, filler material, and adjacent metals are much more elevated, but below the melting point of the electrode wire

SUMMARY

Systems, methods, and apparatus to preheat filler material in welding processes, substantially as illustrated by and described in connection with at least one of the figures, as set forth more completely in the claims.

DRAWINGS

The foregoing and other objects, features, and advantages of the devices, systems, and methods described herein will be apparent from the following description of particular embodiments thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 1b and 1c illustrate diagrams of a welding arc of the welding system of FIG. 1a during a gas tungsten arc welding (GTAW) operation.

FIGS. 2a and 2b illustrate diagrams of the interaction of electromagnetic forces resulting from using a DC preheat power in the welding system.

FIG. 3a illustrates the interaction of electromagnetic forces resulting from using a DC pulsing preheat power in the welding system.

FIG. 3b illustrates the interaction of electromagnetic forces resulting from using an AC preheat power in a welding system.

FIGS. 4a through 4c illustrate diagrams of the averaging of electromagnetic forces resulting from using a DC pulsing preheat power in the welding system.

FIGS. 5a through 5c illustrate diagrams of the averaging of electromagnetic forces resulting from using an AC preheat power in the welding system.

FIG. 6a illustrates an example asynchronous timing diagram for supplying the welding-type power and preheat power in accordance with aspects of this disclosure.

FIGS. 6b and 6c illustrate diagrams of the electromagnetic forces resulting from using asynchronous switching techniques in the welding system of FIG. 1a in accordance with aspects of this disclosure.

FIG. 9 is a flow diagram of an example reciprocation method.

DESCRIPTION

Figure 1A:
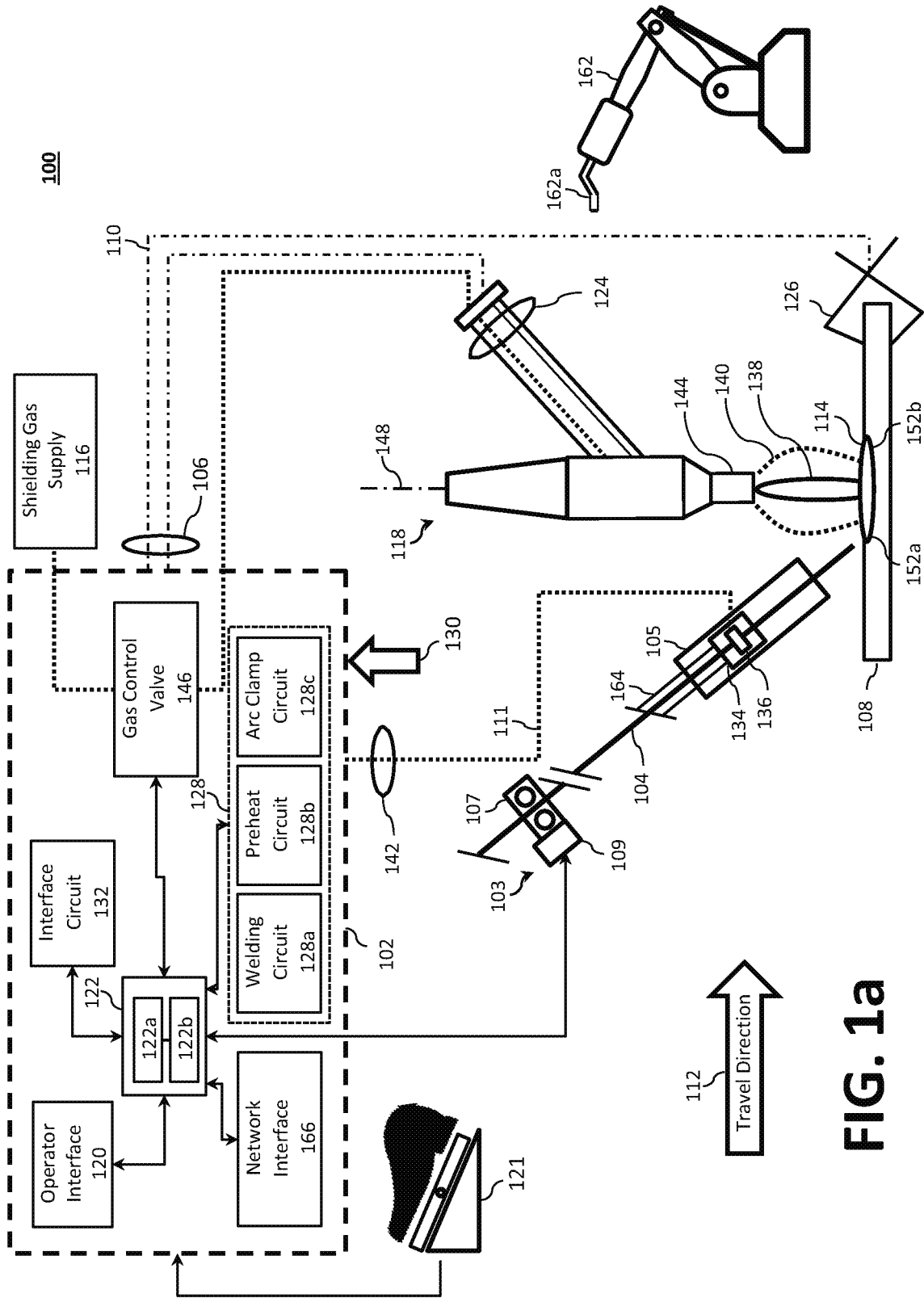
FIG. 1a illustrates an example welding system including a welding power supply configured to convert input power to welding power and preheat power, in accordance with aspects of this disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The term "welding-type system," as used herein, includes any device capable of supplying power suitable for welding, plasma cutting, induction heating, air carbon arc cutting (CAC-A) and/or hot wire welding/preheating (including laser welding and laser cladding), including inverters, converters, choppers, resonant power supplies, quasi-resonant power supplies, etc., as well as control circuitry and other ancillary circuitry associated therewith.

The term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

The terms "circuit" and "circuitry" includes any analog and/or digital components, power and/or control elements, such as a microprocessor, digital signal processor (DSP), software, and the like, discrete and/or integrated components, or portions and/or combinations thereof.

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards, that form part or all of a controller, and are used to control a welding process, a device such as a power source or wire feeder, motion, automation, monitoring, air filtration, displays, and/or any other type of welding-related system.

The term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

The term "torch," "welding torch," "welding tool," or "welding-type tool" refers to a device configured to be manipulated to perform a welding-related task, and can include a handheld welding torch, robotic welding torch, gun, or other device used to create the welding arc.

The term "welding mode," "welding process," "welding-type process," or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

The present methods and systems may be realized in hardware, software, and/or a combination of hardware and software. Example implementations include an application specific integrated circuit and/or a programmable control circuit. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

In GTAW (also known as tungsten inert gas (TIG) welding), it can be advantageous to preheat the incoming filler material before its deposition into the weld puddle. As will be appreciated by those in the art, filler material is sometimes referred to as filler wire and GTAW techniques that preheat the filler wire is sometimes referred to as hot-wire GTAW.

Hot-wire GTAW systems offers certain advantages. Such advantages include, for example, reduction in the amount of work piece heating because the weld puddle does not need to provide as much energy to melt the incoming filler material. This reduction in work piece heating offers a number of benefits. For example, preheating the filler material decreases the heat-affected zone volume, reduces distortion in low-thermal-diffusivity materials, reduces thin material burn through, reduces the size of the arc welding power source, and/or adds heat more precisely to the desired location. Furthermore, preheating the filler material offers energy efficiency gains because the energy loss from the filler material will be less than the energy loss from the work piece.

A difficulty encountered with hot-wire GTAW, however, is the interaction of the electromagnetics forces from the highly resistive preheat power imposed on the welding arc. In operation, the welding arc can be pushed or pulled towards the filler material by these electromagnetics forces depending on the current flow directions of the welding-type power and preheat power. This pushing and/or pulling effect is sometimes called arc blow. In some cases, the welding arc can also be influenced by the permanent magnetization of a ferromagnetic work piece. Permanent magnetization can occur when welding or preheating DC current aligns the work piece magnetic domains. Arc blow is undesirable because the jumping welding arc makes welding more difficult and can result in a lower quality weld.

Welding operators can employ techniques to mitigate the effects of arc blow. In a DC welding system with a hot wire configuration, for example, the current paths may be directed in opposite directions (i.e., inverse directions) of one another to mitigate the effects of arc blow. In practice, this current arrangement pushes the welding arc away from the filler material and allows the filler material to be continuously fed into the weld puddled without burn back. In this arrangement, the filler material is typically fed in on the trailing edge of the weld puddle that is on the opposite side of the travel direction. In an AC hot wire configuration, the AC current pushes and pulls on the welding arc at the AC hot wire frequency. This has the net effect of keeping the welding arc generally coaxial with the electrode; however, the welding arc will sweep a region that defocuses the welding arc making the welding arc softer. It is sometimes desirable or necessary to maintain a highly focused "stiff" welding arc, for example, to access internal joints or to minimize work piece heat input. Where a highly focused welding arc is needed, this AC hot wire configuration is insufficient.

In robotic welding operations, the welding operation can be controlled precisely in terms of speed, angle, position, etc. of the welding torch, but these techniques cannot be easily applied to human operators, which are less predictable and cannot be controlled to the same degree of accuracy as their robotic counterparts. Other pre-heat systems employ angled wire guides and multiple contact tips to introduce a restively preheated filler material at a wide angle, however, such systems are bulkier and more difficult to manipulate manually.

The subject disclosure provides a welding system with a power conversion circuit having a welding circuit and a preheat circuit that work in tandem to eliminate the effects of arc blow without requiring additional hardware, such as cables and/or contact tips. In one example, the preheat circuit is coupled to the filler material via a single contact tip and the work cable (via a work clamp) serves as the return conductor to the preheat circuit. Eliminating additional wiring and contacts enables the filler material to be more readily heated and delivered via a pen or stylus during a manual or semi-automatic operation whereby a human operator manipulates the position and/or angle of the filler material and/or welding torch. To eliminate the effected of arc blow, the welding circuit and the preheat circuit asynchronously switch, via a control circuit, the welding-type power and preheat power. By using an asynchronous switching technique, as will be discussed below, the preheat power is provided only when the welding-type power is off (or is at a background level). Conversely, when the welding-type power is active, the preheat power is off (or is at a background level). In other words, asynchronous switching alternates supply of the welding-type power and the preheat power.

The disclosed welding power source and preheat power source offer a number of advantages, while maintaining the other various benefits of hot-wire GTAW. For example, filler wire can be deposited in any location in the weld pool without experiencing the blow effect. Further, the welding arc is focused and remains coaxial to the electrode. The asynchronous switching process works in semi-automation and automation applications. The asynchronous switching process may be further employed in connection with a reciprocation technique where the filler material is advanced toward and retracted from the weld pool during the welding operation. The asynchronous switching and reciprocation processes may be employed with traditional welding operations (e.g., joining pieces of metal via a weld), cladding, additive manufacturing processes, and other welding-type systems.

According to a first aspect, a welding system to eliminate effects of arc blow, the welding system comprises: welding circuitry configured to provide welding-type power to an electrode of a welding torch to generate a welding arc between a welding work piece and the electrode to form a weld pool during a welding operation; preheat circuitry configured to provide preheat power to heat a filler material; a wire-feeding mechanism configured to advance and retract the filler material relative to the welding work piece during the welding operation; and control circuitry operably coupled to the welding circuitry, the preheat circuitry, and the wire-feeding mechanism, wherein the control circuitry is configured to perform a reciprocation cycle that comprises the steps of: advancing, via the wire-feeding mechanism, the filler material toward the welding work piece until the filler material is electrically connected to the weld pool; supplying the preheat power, via the preheat circuitry, to heat the filler material while the filler material is electrically connected to the weld pool; retracting, via the wire-feeding mechanism, the filler material away from the welding work piece until the filler material is not electrically connected to the weld pool; and terminating supply of the preheat power, via the preheat circuitry, to the filler material while the filler material is not electrically connected to the weld pool.

According to a second aspect, a method of preheating a filler material in welding system to eliminate effects of arc blow during a welding operation comprises: advancing, via a wire-feeding mechanism, a filler material toward a welding work piece until the filler material is electrically connected to a weld pool formed on the welding work piece during a welding operation; supplying a preheat power, via a preheat circuitry, to heat the filler material while the filler material is electrically connected to the weld pool; retracting, via the wire-feeding mechanism, the filler material away from the welding work piece until the filler material is not electrically connected to the weld pool; and terminating supply of the preheat power, via the preheat circuitry, to the filler material while the filler material is not electrically connected to the weld pool.

According to a third aspect, a welding system to eliminate effects of arc blow comprises: welding circuitry configured to provide welding-type power to an electrode of a welding torch during a welding operation; preheat circuitry configured to provide preheat power to heat a filler material; a wire-feeding mechanism configured to advance and retract the filler material relative to a welding work piece during a welding operation; and control circuitry operably coupled to the welding circuitry, the preheat circuitry, and the wire-feeding mechanism, wherein the control circuitry is configured to perform a reciprocation cycle that comprises the steps of: providing the welding-type power at a first welding power level to generate a welding arc between a welding work piece and the electrode to form a weld pool, wherein the welding circuitry is configured to alternate the welding-type power between the first welding power level and a second welding power level that is lower in power than the first welding power level; advancing, via the wire-feeding mechanism, the filler material toward the welding work piece until the filler material is electrically connected to the weld pool, wherein the welding circuitry is configured to switch the welding-type power to the second welding power level before the filler material is electrically connected to the weld pool; supplying the preheat power, via the preheat circuitry, to heat the filler material while the filler material is electrically connected to the weld pool; retracting, via the wire-feeding mechanism, the filler material away from the welding work piece until the filler material is not electrically connected to the weld pool, wherein the welding circuitry is configured to switch the welding-type power to the first welding power level when the filler material is no longer electrically connected to the weld pool; and terminating supply of the preheat power, via the preheat circuitry, to the filler material while the filler material is not electrically connected to the weld pool.

In some aspects, the reciprocation cycle further comprises the step of supplying the welding-type power, via the welding circuitry, to generate the welding arc between a welding work piece and the electrode to form the weld pool. In some aspects, the welding circuitry is configured to alternate the welding-type power between a first welding power level and a second welding power level that is lower in power than the first welding power level. In some aspects, the welding circuitry is configured to supply the welding-type power at the first welding power level while the filler material is not electrically connected to the weld pool.

In some aspects, the welding circuitry is configured to supply the welding-type power at the second welding power level while the filler material is electrically connected to the weld pool. In some aspects, the welding-type power provided in the first welding power level is at least ten times greater than that provided in the second welding power level. In some aspects, the control circuitry is configured to perform the reciprocation cycle at a frequency of 5 to 100 reciprocation cycles per second. In some aspects, the control circuitry is configured to perform the reciprocation cycle at a frequency of 15 to 25 reciprocation cycles per second.

In some aspects, the control circuitry is configured to switch the welding circuitry and the preheat circuitry between power levels asynchronously during the welding operation. In some aspects, the preheat power is direct current (DC) or alternating current (AC). In some aspects, the electrode comprises tungsten. In some aspects, the welding operation is a gas tungsten arc welding (GTAW) operation.

FIG. 1a illustrates an example welding system 100 for performing welding-type operations on a welding work piece 108. The illustrated welding system 100 is configured to perform, for example, hot-wire GTAW in accordance with aspects of this disclosure. The welding system 100 is illustrated as generally comprising a power supply 102, a welding torch 118, and a heater assembly 134.

As illustrated, the power supply 102 and the welding torch 118 are coupled via conductors or conduits 106, while the power supply 102 and the heater assembly 134 are coupled via conductors or conduits 142. As illustrated, the heater assembly 134 and filler material 104 may be provided via, for example, a pen or stylus 105.

The illustrated power supply 102 generally comprises a control circuitry 122, an operator interface 120, interface circuit 132, power conversion circuit 128, network interface 166, and one or more gas control valves 146. While the various components may be provided in a single enclosure, one or more components of the power supply 102 may be provided outside the enclosure. In one example, the one or more gas control valves 146 could be provided as a separate device.

Terminals are typically provided on the power supply 102 to allow the conductors or conduits 106, 142 to be coupled to the power supply 102 to allow for power and gas to be provided from the power supply 102 to the welding torch 118 or to the heater assembly 134. Terminals may also be provided to allow data to be exchanged between the power supply 102, operator controls (e.g., a foot pedal 121), and a remote device (or even another component of the welding system 100). For example, the power supply 102 may provide welding-type power and shielding gas 140 to the welding torch 118 at a location adjacent to the welding work piece 108 via the conduits 106, while the power supply 102 may provide preheat power to the heater assembly 134 via the conduits 142. A work cable 110 is run to the welding work piece 108 to complete an electrical circuit between the power supply 102 (e.g., the welding circuitry 128a and/or preheat circuitry 128b) and the welding work piece 108 via a work clamp 126.

The welding system 100 is configured for weld settings (e.g., weld parameters, such as voltage, wire feed speed, current, gas flow, inductance, physical weld parameters, advanced welding programs, pulse parameters, etc.) to be selected by the operator and/or a welding sequence, such as via an operator interface 120 provided on the power supply 102. The operator interface 120 may receive inputs using any input device, such as via a keypad, keyboard, buttons, touch screen, voice activation system, wireless device, foot pedal 121, etc.

The operator interface 120 will typically be incorporated into a front faceplate of the power supply 102, and may allow for selection of settings such as the weld process, the type of wire to be used, voltage and current settings, and so forth. In particular, the example welding system 100 is configured to allow for welding with various steels, aluminums, or other welding wire that is channeled through the welding torch 118. These weld settings are communicated to a control circuitry 122 within the power supply 102. The system may be particularly adapted to implement welding regimes configured for certain electrode types. The control circuitry 122, operates to control generation of welding power output that is supplied to the electrode 144 for carrying out the desired welding operation.

The operator interface 120 may receive inputs specifying wire material (e.g., steel, aluminum), wire type (e.g., solid, cored), wire diameter, gas type, and/or any other parameters. Upon receiving the input, the control circuitry 122 determines the welding output for the welding application. For example, the control circuitry 122 may determine weld voltage, weld current, wire feed speed, inductance, weld pulse width, relative pulse amplitude, wave shape, preheating voltage, preheating current, preheating pulse, preheating resistance, preheating energy input, and/or any other welding and/or preheating parameters for a welding process based at least in part on the input received through the operator interface 120.

The welding torch 118 applies welding-type power from the power supply 102 to the electrode 144, typically by a welding cable 124. Similarly, shielding gas 140 from a shielding gas supply 116 is fed through the welding cable 124. The welding torch 118 may be a GTAW torch, but other welding torch are contemplated (e.g., GMAW, FCAW, SMAW).

The filler material 104 may be delivered to the weld pool 114 arc via a liner 164, which may be position on or near the welding torch 118. When configured for manual or semi-automatic operation whereby a human operator manipulates the position and/or angle of the filler material 104 and/or welding torch 118, the filler material 104 may be provided via a handheld pen or stylus 105. A foot pedal 121 may also be provided to enable the human operator to start and stop supply of welding-type power from the welding circuitry 128a to the welding torch 118. The foot pedal 121 may be connected to the welding system 100 via the operator interface 120 or the control circuitry 122 via, for example, a conduit and/or electrical connecter (e.g., a plug).

The welding current flows between the electrode 144 and the welding work piece 108, which in turn generates the welding arc 138 between the weld pool 114 on the welding work piece 108 and the electrode 144 during the welding operation. The electrode 144 may be, for example, a tungsten electrode.

When the welding arc 138 exists between the electrode 144 and the welding work piece 108, an electrical circuit is completed and the welding power flows, depending on polarity, through the electrode 144, across the welding arc 138, across the welding work piece(s) 108, and returns to the power conversion circuit 128 via the work cable 110 and work clamp 126. When polarity is reversed, the current flow direction is reversed. Therefore, the work cable 110 and work clamp 126 allow for closing an electrical circuit from the power supply 102 (e.g., the power conversion circuit 128) through the welding work piece 108.

During a welding operation, the filler material 104 is fed into and becomes part of the weld pool 114. Due to the temperature difference, the filler material 104 is melted by heat from the weld pool 114, which is ultimately heated by the welding arc 138. By preheating the filler material 104, a welding arc 138 may be generated with reduced arc energy because the weld pool 114 does not require as much heat (energy) to melt the incoming filler material 104.

The control circuitry 122 includes one or more controller(s) and/or processor(s) 122*a* that controls the operations of the power supply 102. The control circuitry 122 receives and processes multiple inputs associated with the performance and demands of the system. The processor(s) 122*a* may include one or more microprocessors, such as one or more "general-purpose" microprocessors, one or more special-purpose microprocessors and/or application-specific integrated circuit (ASICs), one or more microcontrollers, and/or any other type of processing and/or logic device. For example, the control circuitry 122 may include one or more digital signal processors (DSPs). The control circuitry 122 may include circuitry such as relay circuitry, voltage and current sensing circuitry, power storage circuitry, and/or other circuitry, and is configured to sense the primary power received by the power supply 102.

The example control circuitry 122 includes one or more memory device(s) 122*b*. The memory device(s) 122*b* may include volatile and/or nonvolatile memory and/or storage devices, such as random access memory (RAM), read only memory (ROM), flash memory, hard drives, solid state storage, and/or any other suitable optical, magnetic, and/or solid-state storage mediums. The memory device(s) 122*b* store data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a work piece, a voltage, a current, welding device settings, and so forth. The memory device 122*b* may store machine executable instructions (e.g., firmware or software) for execution by the processor(s) 122*a*. Additionally or alternatively, one or more control schemes for various welding processes, along with associated settings and parameters, may be stored in the memory device(s) 122*b*, along with machine executable instructions configured to provide a specific output (e.g., initiate wire feed, enable gas flow, capture welding current data, detect short circuit parameters, determine amount of spatter) during operation.

The power conversion circuit 128 is coupled to the control circuitry 122. The power conversion circuit 128 converts the input power from a source of electrical power as indicated by arrow 130 to one or both of output welding-type power and/or preheat power, which are output to the welding torch 118 and the heater assembly 134, respectively. For example, as illustrated, the power conversion circuit 128 can comprise welding circuitry 128*a*, preheat circuitry 128*b*, and an arc clamp circuit 128*c*. For example, welding-type power may pass from the welding circuitry 128*a* to the electrode 144 of the welding torch 118, through the welding work piece 108, and back to the welding circuitry 128*a* via the work cable 110 and work clamp 126 to maintain the welding arc 138. Similarly, preheat power may pass from the preheat circuitry 128*b* to the filler material 104 (e.g., via a contact tip 136 of a heater assembly 134), through the welding work piece 108, and back to the preheat circuitry 128*b* via the work cable 110 and work clamp 126 to preheat the filler material 104 during the welding operation.

The arc clamp circuit 128*c*, in conjunction with the control circuitry 122, may be used to control operation of the welding circuitry 128*a* and/or the preheat circuitry 128*b* of the power conversion circuit 128. An arc clamp circuit 128*c*, as used herein, refers to a circuit that limits the output voltage of the power supply 102 by providing a current path alternative to the arc so that an arc is extinguished, prevented from forming, or otherwise controlled. The arc clamp circuit 128*c* can be passive, wherein it operates without control, or active, wherein it operates in response to one or more control signals.

Such an arc clamp circuit 128*c* may include a diode and/or a transistor. For example, the arc clamp circuit 128*c* may include a transient voltage suppressor (TVS) and/or a plurality of diodes, arranged such that the voltage drop across the arc clamp circuit 128*c* limits the current in the arc at a desired voltage across the arc clamp circuit 128*c* in an example. TVS includes modules or devices that are designed to react to sudden or momentary over voltage conditions. For example, leads and/or circuitry may be connected between the arc clamp circuit 128*c* and one or both of the electrode 144 and the contact tip 136 to provide a feedback signal to the control circuitry 122. A feedback circuit may be used that includes a current and/or voltage sensor. The arc clamp circuit 128*c* may be controlled in response to current and/or voltage measured from these and/or other sensors. In one example, a control loop may be used to monitor the average voltage of the preheat-type power over time, where the preheat-type power is adjusted (e.g., lowered, shut off, etc.) when an unwanted or unexpected deviation from the average voltage is detected. In some examples, an arc clamp circuit 128*c* may be used to control formation of an arc between the filler material 104 and the welding work piece 108 by clamping the voltage to less than an arc striking voltage.

In operation, the control circuitry 122 receives information from the arc clamp circuit 128*c* to control the voltage across the arc and/or control the current through the arc by providing an alternative current path. The control circuitry 122 can prevent the voltage or current from rising above a predetermined threshold level, and/or to control an arc or short circuit between the filler material 104 and the welding work piece 108 via the arc clamp circuit 128*c*. For example, in the case of preheating, the arc clamp circuit 128*c* can redirect the flow of current such that part or all of the current from the preheat circuitry 128*b* bypasses existing path with the filler material 104, such that the voltage and/or current level does not exceed a threshold value.

The heater assembly 134 may be integrated with, for example, a pen or stylus 105 for manual or semi-automatic operation. For ease of illustration, portions of the stylus 105, heater assembly 134, and liner 164 are cut away in FIG. 1*a*. As illustrated, in some examples, the heater assembly 134 may include a single contact tip 136 that electrically connects the preheat circuitry 128*b* to the filler material 104. In operation, the preheat circuitry 128*b* supplies a preheat power to the heater assembly 134 via a power cable 111 (e.g., via conduits 142), which passes the preheat power between the contact tip 136 and the work cable 110 via the filler material 104 to heat the filler material 104. In one example, the preheat power enters the filler material 104 from the power cable 111 via the contact tip 136 and exits via the work cable 110 (or vice versa, depending on current flow direction). Current flowing through the filler material 104 heats the filler material 104 through a technique called resistive preheating.

Using the work cable 110 as a return obviates the need to run multiple cables between the preheat circuitry 128*b* and the heater assembly 134, thereby making it easier for the operator to manipulate the filler material 104 (e.g., the stylus 105). As a result this arrangement is well-suited for manual and semi-automatic operation where a human operator manipulates the position and/or angle for the pen or stylus 105 and the welding torch 118. In some examples, while the welding torch 118 and the heater assembly 134 are illustrated as separate components, the heater assembly 134 may be coupled to, or integrated with, the welding torch 118 where the filler material 104 is fed to the weld pool 114 via the liner 164. In certain aspects, the filler material 104 could be supplied using a wire feeder.

In some examples, whether manual, semi-automatic, or fully automatic operation, the filler material 104 may be dispensed from a source (e.g., a wire source, such as a spool) via a wire-feeding mechanism 103. In one example, the wire-feeding mechanism 103 may comprise a drive roller 107 that is driven by an electric motor 109. In some examples, the electric motor 109 is configured to control the direction and speed of the filler material 104 supplied, for example, to the weld pool 114. The electric motor 109 may be controlled by the control circuitry 122 as a function of one or more welding parameters, such voltage, current, bead size, pool width, travel speed, etc. To that end, the electric motor 109 may be configured to provide feedback to the control circuitry 122 (e.g., motor position, speed, direction, etc.).

In one example, as will be described in connection with FIGS. 8 and 9, the wire-feeding mechanism 103 may configured to advance and retract the filler material 104 during a welding operation to achieve a reciprocating motion while feeding the filler material 104. For example, in addition to more generally feeding the filler material 104 into the weld pool 114, the wire-feeding mechanism 103 may advance and retract the filler material 104 into and out of the weld pool 114. To that end, the wire-feeding mechanism 103 may drive the electric motor 109 forward and backwards (e.g., changing direction of the motor's rotation) to provide the reciprocating motion. In another example, the reciprocating motion may be achieved by mounting the electric motor 109 (and drive mechanisms, such as drive roller 107) to a cam mechanism. In yet another example, other intermittent drive mechanisms may be introduces to achieve a reciprocating motion while feeding the filler material 104, such as Geneva mechanisms, mutilated gears, piezo linear actuators, harmonic oscillators that vibrate the filler material 104 (or drive roller 107), etc.

Various power conversion circuits may be employed as part of the power conversion circuit 128, including choppers, boost circuitry, buck circuitry, inverters, converters, and/or other switched mode power supply circuitry, and/or any other type of power conversion circuitry. The welding circuitry 128*a* is adapted to create a welding-type power, such as pulsed waveforms applied to the electrode 144 at the welding torch 118. The preheat circuitry 128*b* is adapted to provide the preheat power that is supplied to the filler material 104 in "pulses" via one or more switches and the heater assembly 134. While the welding circuitry 128*a* and the preheat circuitry 128*b* are illustrated as components of the same power conversion circuit 128, the welding circuitry 128*a* and the preheat circuitry 128*b* may be provided as separate devices or circuits.

The power conversion circuit 128 is coupled to a source of electrical power as indicated by arrow 130. In some examples, the power received by the power conversion circuit 128 is an AC voltage between approximately 110V and 575V, between approximately 110V and 480V, or between approximately 110V and 240V. The power applied to the power conversion circuit 128 may originate in the power grid, although other sources of power may also be used, such as power generated by an engine-driven generator, batteries, fuel cells, or other alternative sources. The example power conversion circuit 128 may implement one or more controlled voltage control loop(s), one or more controlled current control loop(s), one or more controlled power control loops, one or more controlled enthalpy control loops, and/or one or more controlled resistance control loops to control the voltage and/or current output to the welding circuit and/or to the preheating circuit. As described in more detail below, the power conversion circuit 128 may be implemented using one or more converter circuits, such as multiple converter circuits in which each of the welding-type power and the preheat power is produced using separate ones of the converter circuits (e.g., the welding circuitry 128*a* and the preheat circuitry 128*b*).

In some examples, the power conversion circuit 128 may include polarity reversing circuitry. Polarity reversing circuitry reverses the polarity of the output welding-type power when directed by the control circuitry 122. For example, some welding processes, such as GTAW, may enable a desired weld when the electrode has a negative polarity, known as DC electrode negative (DCEN). Other welding processes, such as SMAW or GMAW welding, may enable a desired weld when the electrode has a positive polarity, known as DC electrode positive (DCEP). When switching between a GTAW process and a GMAW process, the polarity reversing circuitry may be configured to reverse the polarity from DCEN to DCEP.

While the welding system 100 is well-suited for manual operation, the present disclosure may be applied to robotic arc welding systems. In some examples, the welding torch 118 may be part of a robotic arc welding system in which a robotic arm 162 controls the location and operation of the electrode 144 by manipulating the welding torch 118. In this example, the welding torch 118 may be coupled to the working end 162*a* of the robotic arm 162. The heater assembly 134 and/or liner 164 may be coupled to, or integrated with, the welding torch 118 or the robotic arm 162. Operation of the robotic arm 162 (e.g., its various motors, actuators, etc.) and triggering the starting and stopping of the current flow may be controlled by the control circuitry 122 (e.g., rather than foot pedal 121). In another example, a separate robotic control circuit may be provided that is configured to control the robotic arm 162 and is communicatively coupled to control circuitry 122 via the interface circuit 132 or the network interface 166.

The power supply 102 illustrated in FIG. 1*a* may also include an interface circuit 132 configured to allow the control circuitry 122 to exchange signals with other devices. The power supply 102 may comprise a network interface 166 configured to communicate data (e.g., measurements, commands, etc.) with another device; whether a remote server, computer, or the like (via its network interface 166).

The filler material 104 is illustrated as being fed at the trailing edge 152*a* of the weld pool 114 that is on the opposite side of the travel direction 112, where the side of the travel direction 112 is called the leading edge 152*b*. As can be appreciated, the angle at which the welding arc 138 in formed between the electrode 144 and the weld pool 114 can be influenced by interaction of the electromagnetics forces formed by electrical currents passing through the electrode 144, the weld pool 114, and/or the filler material 104. For simplicity of illustration, one or more arrows will be sometimes be used in the drawings to represent the arc vector 150 (e.g., the angle) of the welding arc 138 and various current-flow directions.

The interaction of the electromagnetics forces will now be described and illustrated under various scenarios. FIGS. 1*b* and 1*c* illustrate diagrams of the welding arc 138 of the welding system 100 during a GTAW operation using an unheated (e.g., cold) filler material 104. In other words, welding-type power passes through the electrode 144 to form the welding arc 138, but, since preheating is not involved in this example, preheat power does not pass through the filler material 104. As illustrated in FIG. 1*b*, the arc vector 150 of the welding arc 138 is coaxial with the electrode 144 when the filler material 104 is detached from the weld pool 114. Therefore, absent the filler material 104, the arc vector 150 of the welding arc 138 remains coaxial as the welding torch 118 (and, therefore, the electrode 144) moves in the travel direction 112 to form the weld. Specifically, as illustrated, the arc vector 150 is coaxial with the electrode center 148 that is defined by the longitudinal axis of the electrode 144. Introducing the filler material 104 into the weld pool 114, however, presents a preheating effect. As illustrated in the example of FIG. 1*c*, the arc vector 150 of the welding arc 138 is no longer coaxial with the electrode 144 when the filler material 104 is introduced to the weld pool 114, but rather, the welding arc 138 is pulled toward the filler material 104 as indicated by the arrow direction of the arc vector 150.

FIGS. 2*a* and 2*b* illustrate example diagrams of the interaction of electromagnetic forces resulting from using a DC preheat power in the welding system 100. As illustrated in the legend, the arrows are used to represent the current flow directions of the welding-type power and preheat power, while the "X" symbols represents the magnetic field entering plane and the "." symbols represents the magnetic field exiting plane.

As illustrated in the example of FIG. 2*a*, the welding current path 154 of the welding-type power used to form the welding arc 138 travels from the electrode 144 to the welding work piece 108 as indicated by the arrow, while the preheat current path 156 of the preheat power used to heat the filler material 104 travels away from the welding work piece 108 as indicated by the arrow. The welding current path 154 and preheat current path 156 create repulsive forces. Therefore, in this example configuration the arc vector 150 will provide arc blow in the travel direction 112 as indicate by the arrow (e.g., away from the filler material 104). The weld pool center 158 may, therefore, lead the electrode center 148 and the filler material 104 may enter the trailing edge 152*a* of the weld pool 114. Reversing the polarity of the DC preheat power (i.e., reversing the direction of the current flow), however, will affect the arc vector 150. For example, as illustrated in FIG. 2*b*, the welding current path 154 of the welding-type power used to form the welding arc 138 still travels from the electrode 144 to the welding work piece 108 as indicated by the arrow, but the preheat current path 156 of the preheat power used to heat the filler material 104 has been reversed to travel toward the welding work piece 108 as indicated by the arrow. In this example, the welding current path 154 and preheat current path 156 produce attractive forces. Therefore, in this configuration the arc vector 150 will blow toward the travel direction 112. The weld pool center 158 may trail the electrode center 148 and the filler material 104 may enter the leading edge 152*b* of the weld pool 114.

Mechanical and/or electrical techniques may be employed to mitigate such arc blow by balancing the electromagnetics forces. For example, the preheat power may be reduced using mechanical methods, thereby reducing its electromagnetics forces. The preheat power may be reduced by using a smaller diameter wire may be used as filler material 104, limiting the welding process to highly resistive materials, and/or extending the stick out length of the filler material 104. In another example, the feed angle and location of the filler material 104 relative to the electrode 144 can be adjusted via, for example, a wide angle wire guide to counter the arc blow. In yet another example, the electrode 144 may be placed closer to the weld pool 114 to limit the length of the welding arc 138, thereby reducing the amount the arc blow.

In addition, various control and/or drive schemes can be used and implemented through circuitry and/or software. For example, the preheat power may be provide as a pulsed DC preheat power or an AC preheat power. In another example, which will be described in connection with FIGS. 6*a* through 6*c*, the preheat power and the welding-type power may be asynchronously switched. In yet another example, which will be described in connection with FIG. 8, the filler material 104 may be advanced and retracted through a reciprocating motion.

When preheat power is not flowing through the filler material 104, the welding arc 138 will pull toward the filler material 104, but when preheat power is flowing through the filler material 104, the welding arc 138 will blow away from the filler material 104. The two forces can be balanced to provide better arc directionality control and keep the welding arc 138 coaxial with the electrode 144. FIGS. 3*a* and 3*b* illustrate diagrams representing the interaction of electromagnetic forces in the welding system 100 to maintain an average coaxial arc using a preheat power that is, respectively, a DC pulsing preheat power and an AC preheat power. For example, the electromagnetic forces may be balanced using a DC pulsing preheat power (e.g., switching the DC current on and off) or using an AC preheat power (which sinusoidally switches between positive and negative). Selection between DC pulsing preheat power and AC preheat power may be dependent on geometry and electrical settings.

FIGS. 4*a*, 4*b*, and 4*c* illustrate diagrams representing the averaging the forces using DC pulsing preheat power. Specifically, FIG. 4*a* illustrates the arc vector 150 when the preheat power is not flowing through the filler material 104, while the FIG. 4*b* illustrates the arc vector 150 when the preheat power is flowing through the filler material. In operation, the welding system 100 will oscillate between the arc vectors 150 of FIGS. 4*a* and 4*b* to effectively yield the average coaxial arc vector 150 of FIG. 4*c*. The oscillating motion of the welding arc 138 will sweep a region that defocuses the welding arc 138 making the welding arc softer as signified by the broken-line arrows; however, as noted above, it is sometimes desirable or necessary to maintain a highly focused welding arc.

FIGS. 5*a*, 5*b*, and 5*c* illustrate diagrams representing the averaging the forces using AC preheat power. FIG. 5*a* illustrates the arc vector 150 during a first half cycle of the AC sinusoidal waveform, while the FIG. 5*b* illustrates the arc vector 150 during a second half cycle of the AC sinusoidal waveform. As can be appreciated from the figures, the preheat current path 156 changes directions between the first and second half cycles of the AC sinusoidal waveform. In operation, the welding system 100 will oscillate between the arc vectors 150 of FIGS. 5a and 5b to effectively yield the average coaxial arc vector 150 of FIG. 5c. As with the DC-pulsing preheating, the oscillating motion of the welding arc 138 will sweep a region that defocuses the welding arc 138 making the welding arc softer as signified by the broken-line arrows.

FIG. 6a illustrates an example asynchronous timing diagram 600 for supplying the welding-type power 602 and preheat power 604 in accordance with one aspect of this disclosure. In this example, the welding-type power 602 and preheat power 604 are switched (e.g., "pulsed") between power levels (e.g., power modes or states) asynchronously. The welding-type power 602 and preheat power 604 are switched between power levels asynchronously such that the welding-type power 602 and preheat power 604 are not "on" simultaneously (i.e., they alternate supply of the welding-type power and the preheat power).

As illustrated, each of the welding-type power 602 and preheat power 604 may be switched "on" and "off" during a welding operation. Notably, the welding-type power 602 and preheat power 604 are switched asynchronously to provide the coaxial focused arc vector 150 while obviating additional hardware, cables, and/or a need to supply the filler material 104 at large angle relative to the electrode 144. The filler material 104 is deposited into the weld pool 114 with a small angle between the stylus 105 (or other wire delivery device) and electrode 144. As a result, the welding torch 118 can be more compact because filler wire delivery system does not have a bend to achieve a larger angle. Eliminating the bend also improves wire feeding by reducing drag and eliminating wire cast.

When the welding-type power 602 is switched "off" during the welding operation, a small amount of background power may still flow through the electrode 144 to avoid having to reinitiate the welding arc 138. Reinitiate the welding arc 138 can in introduce complications and may cause the welding arc 138 to wobble until it can re-stabilize. The small amount of background power contributes only a negligible amount of electromagnetic force to the overall system, but avoids the obstacles associated with reinitiating the welding arc 138. Therefore, the background power may be provided to preserve the welding arc 138 when the weld power 602 is switched from a high welding power level 602a and a low welding power level 602b (e.g., effectively "off").

In view of the foregoing, the welding-type power 602 may be switched between a high welding power level 602a (i.e., a first welding power level) and a low welding power level 602b (i.e., a second welding power level) during a welding operation. In one example, the amount of welding-type power 602 provided as a background power at the low welding power level 602b may be about 5 to 20 percent, or about 10 percent, that of the high welding power level 602a so as preserve the welding arc 138, while minimizing the amount of electromagnetic forces. In other words, the welding-type power 602 provided in the high welding power level 602a may be at least ten times greater than that provided in the low welding power level 602b.

The preheat power 604 may be similarly switched between a high preheat power level 604a (i.e., a first preheat power level) and a low preheat power level 604b (i.e., a second preheat power level) during a welding operation; however, as illustrated, the preheat power 604 may be fully shut off during the low preheat power level 604b because the preheat power 604 is not essential to preserving the welding arc 138. In other words, the preheat circuitry 128b need not provide preheat power 604 when switched to the low preheat power level 604b.

Turning now to FIG. 6a, as represented by Period A, when the welding-type power 602 is switched on to the high welding power level 602a (i.e., the welding-type power 602 is being supplied to the electrode 144), the preheat power 604 is switched off to the low preheat power level 604b. Conversely, as represented by Period B, when the welding-type power 602 is off to the low welding power level 602b (i.e., the welding-type power 602 is not being supplied to the electrode 144), the preheat power 604 is switched on to the high preheat power level 604a (i.e., the preheat power 604 is supplied to the filler material 104). A benefit of the asynchronous switching over the above-described DC pulsing or AC methods is that the welding arc 138 is focused because it does not oscillate and, therefore, offers increased focusing from the magnetic pinch effect.

In one example, the welding system 100 may be configured to eliminate effects of arc blow in a GTAW operation, where the welding system 100 includes welding circuitry 128a, preheat circuitry 128b, and control circuitry 122 configured to switch the welding circuitry 128a and the preheat circuitry 128b between power levels asynchronously during the welding operation. To that end, the welding circuitry 128a can be configured to provide welding-type power 602 to a tungsten electrode 144 of a welding torch 118 to generate a welding arc 138 between a welding work piece 108 and the tungsten electrode 144 to form a weld pool 114 during a welding operation. The welding circuitry 128a is configured to alternate the welding-type power 602 between a first welding power level 602a and a second welding power level 602b that is lower in power than the first welding power level 602a. The second welding power level 602b may be, for example, 5 to 20 percent, or about 10 percent of the first welding power level 602a. The preheat circuitry 128b configured to provide preheat power 604 to heat a filler material 104 and configured to alternate the preheat power 604 between a first preheat power level 604a and a second preheat power level 604b that is lower in power than the first preheat power level 604a. The control circuitry 122 configured to switch the welding circuitry 128a and the preheat circuitry 128b between power levels asynchronously such that the preheat circuitry 128b is switched to the second preheat power level 604b when the welding circuitry 128a is switched to the first welding power level 602a and the preheat circuitry 128b is switched to the first preheat power level 604a when the welding circuitry 128a is switched to the second welding power level 602b.

The disclosed asynchronous switching technique and associated welding system 100 is well-suited for human operators because it eliminates arc blow even in the presence of operator uncertainty (e.g., deviation, operator error, movement, etc.). For example, whereas a robotic system can be controlled precisely in terms of speed, angle, position, etc. of the welding torch 118 and/or filler material 104, human operators are less predictable and cannot be controlled to the same degree of accuracy as their robotic counterparts. Therefore, the disclosed asynchronous switching technique is particularly well-suited for manual operation as compared to other solutions that eliminate arc blow in robotic systems through precise control (e.g., of movement, angle, etc.). As noted above, the disclosed asynchronous switching technique also allows the work cable 110 and work clamp 126 to serve as the electrical return to the preheat circuitry 128b without introducing arc blow, thereby eliminating the need for additional contact tips (e.g., a dual contact preheat arrangement) and associated cabling to provide a more compact and more easily manipulated assembly.

The duration (e.g., length of time) for Periods A and B may be adjusted to achieved a desired arc vector 150 based on the various welding parameters at issue, such as materials used, current, voltage, etc. For example, if desired, the duration of each pulse may be adjusted (increased or decreased) to yield a directed arc vector 150. The phase diagram is illustrated with Periods A and B, which collectively represent a power cycle. For example, the welding system 100 may asynchronously switch the periodically (e.g., at regular intervals) through the power cycles until completion of the welding operation (e.g., release of the foot pedal 121). The welding system 100 may implement the asynchronous switching technique at a frequency of 5 to 100 power cycles per second (i.e., 5-100 Hz), or about 15 to 25 power cycles per second (i.e., 15-25 Hz).

Further, while the pulse durations for Periods A and B are illustrated in FIG. 6a as being the same duration, it is contemplated that Periods A and B may have different durations if the operator wishes to direct the arc vector 150 in a particular direction. For example, Period A may be increased or decreased relative to Period B to direct welding arc 138 toward or way from the filler material 104.

FIG. 6b illustrate the arc vector 150 resulting from the electromagnetic forces during Period A when the welding-type power 602 is switched to a high welding power level 602a and the preheat power 604 is switch to a low preheat power level 604b. As illustrated, the welding arc 138 attaches to the filler material 104 as represented by arc vector 150. The resulting electromagnetic forces are akin to the cold wire described above in connection with FIG. 1c. FIG. 6c illustrate the arc vector 150 resulting from the electromagnetic forces during Period B when the welding-type power 602 is switched to a low welding power level 602b (e.g., only a background current is present) and the preheat power 604 is switched to a high preheat power level 604a. As illustrated, the welding arc 138 deflects from the filler material 104 as represented by arc vector 150. Asynchronous switching yields a welding arc 138 that is focused and does not oscillate; therefore, the travel direction isn't relevant because the filler material 104 can be introduced on either the leading edge or the trailing edge of the weld pool 114 without affecting the welding arc 138.

Figure 7:
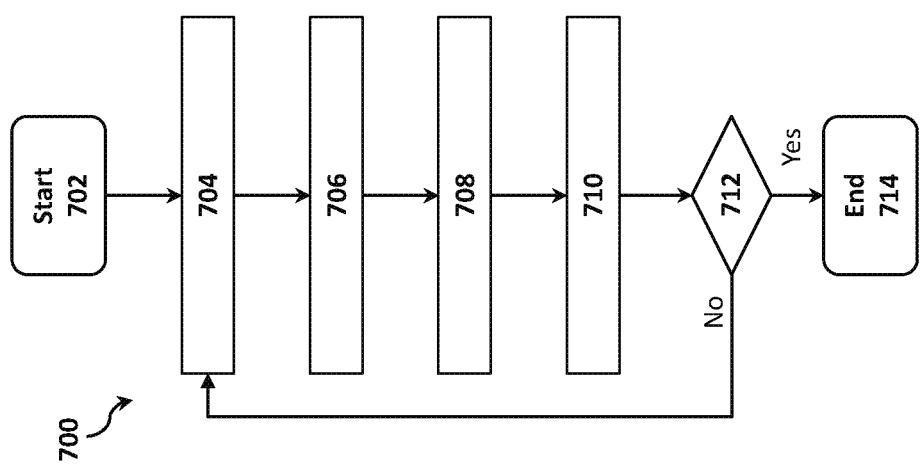
FIG. 7 is a flow diagram of an example asynchronous switching method.

FIG. 7 is a flow diagram of an example asynchronous switching method 700. More specifically, a method 700 of preheating a filler material 104 in welding system 100 to eliminate effects of arc blow arc blow during a welding operation. As will be appreciated, the method 700, via the control circuitry 122, switches the welding circuitry 128a and the preheat circuitry 128b between power levels asynchronously. For example, as explained in connection with FIG. 6a, the preheat circuitry 128b is at the second preheat power level 604b when the welding circuitry 128a is switched to the first welding power level 602a, while the preheat circuitry 128b is the first preheat power level 604a when the welding circuitry 128a is switched to the second welding power level 602b. The method 700 starts at step 702 upon starting a welding operation by, for example, actuating the foot pedal, trigger, or other operator device.

At step 704, the preheat circuitry 128b provides the preheat power 604 at a first preheat power level 604a to heat the filler material 104. The preheat circuitry 128b is configured to alternate the preheat power 604 between the first preheat power level 604a and a second preheat power level 604b that is lower in power than the first preheat power level 604a.

At step 706, the control circuitry 122 switches the preheat circuitry 128b to provide preheat power 604 at the second preheat power level 604b.

At step 708, the welding circuitry 128a provides the welding-type power 602 to an electrode 144 of a welding torch 118 at a first welding power level 602a to generate a welding arc 138 between a welding work piece 108 and the electrode 144 to form a weld pool 114. The welding circuitry 128a is configured to alternate the welding-type power 602 between the first welding power level 602a and a second welding power level 602b that is lower in power than the first welding power level 602a.

At step 710, the control circuitry 122 switches the welding circuitry 128a to provide welding-type power 602 at the second welding power level 602b.

At step 712, the control circuitry 122 determines whether the welding operation is terminated. The welding operation may be terminated by, for example, releasing the foot pedal, trigger, or other operator device. It the welding operation is terminated step 712, the method ends at step 714, otherwise, the method 700 returns to step 704 to repeat the process.

In another example, which will be described in connection with FIG. 8, the filler material 104 may be advanced and retracted through a reciprocating motion using one or more reciprocation techniques. The welding-type power 602 and preheat power 604 may also be adjusted as a function of a position and/or a movement of the filler material 104 (e.g., whether the filler material 104 is advanced, retracted, stationary, moving, etc.). For example, the welding-type power 602 and preheat power 604 may be asynchronous switched. Such a reciprocation technique offers advantages. For example, the welding torch 118 and wire guide (e.g., as provided by the stylus 105) may be more compact. The disclosed reciprocation technique further improves the wire feeding and wire placement accuracy, while reducing the requirements of the electric motor 109 by eliminating the wire guide bend. For example, existing GTAW torches, such as those used in robotic applications, typically use a wire guide coupled to the torch that is shaped (e.g., bent) to redirect the wire such that it enters the welding arc or pool at a large angle relative to the torch (e.g., 15-30 relative to the welding work piece 108). Such bent wire guides, while effective, are bulky and are less practical in tight spaces and in manual and semi-automatic operation. Conversely, with reference to FIGS. 6a and 6b, the filler material 104 may be fed, via the present welding system 100, to the weld pool 114 at an angle that is less than 15 degrees relative to the tungsten electrode 144 (angle $\alpha$) or greater than 75 degrees relative to the welding work piece 108 (angle $\beta$). This arrangement makes the welding torch 118 more compact because the filler material 104 can be fed through a barrel of the welding torch 118. While the describe reciprocation technique may be employed in conjunction with the above-disclosed asynchronous switching, the reciprocation techniques may also be applied to welding techniques that do not employ asynchronous switching.

Figure 8:
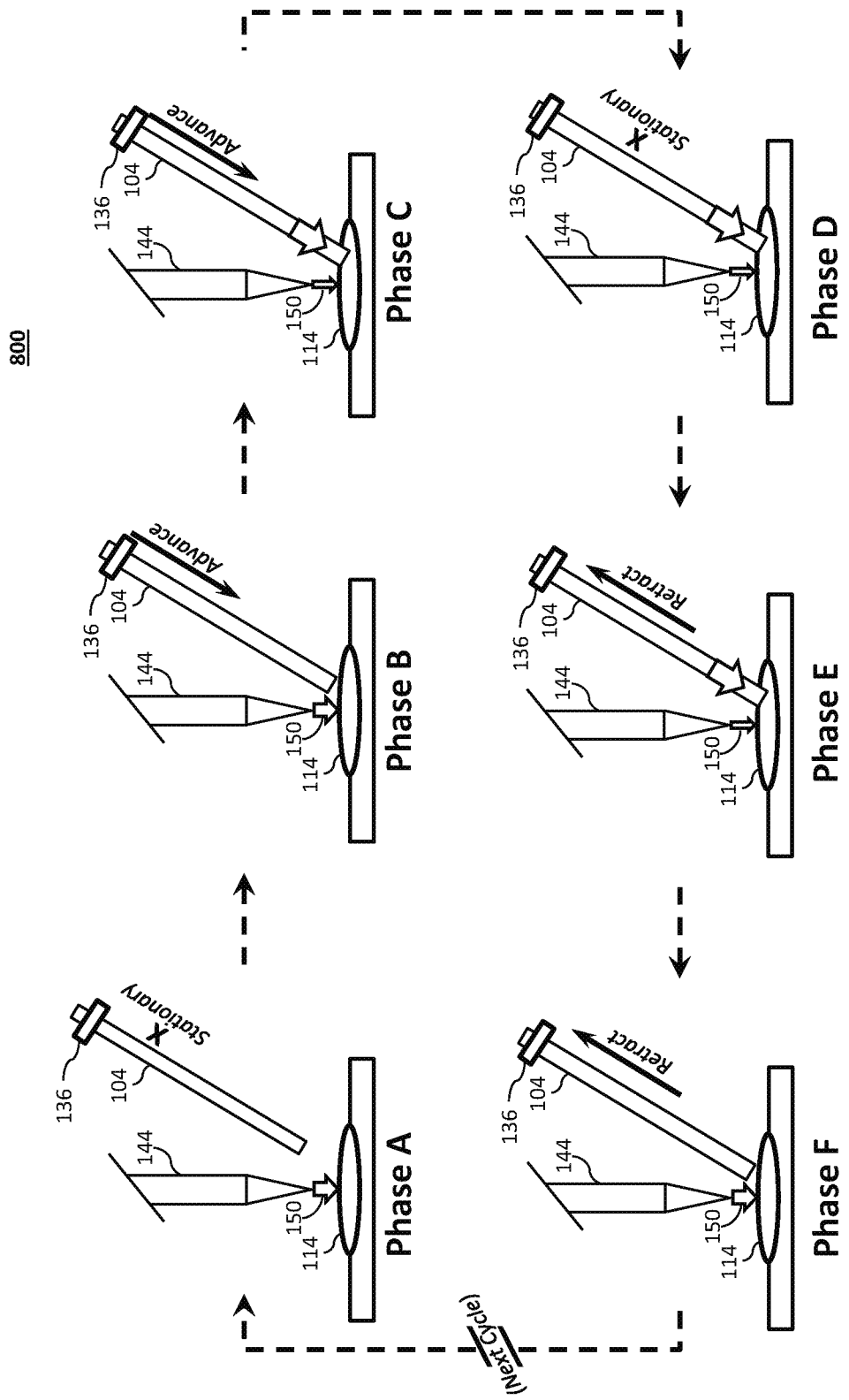
FIG. 8 illustrates a phase diagram for supplying the welding-type power and preheat power in the welding system of FIG. 1a using a reciprocation technique in accordance with aspects of this disclosure.

FIG. 8 illustrates a phase diagram 800 for supplying the welding-type power 602 and preheat power 604 in the welding system 100 of FIG. 1a using a reciprocation technique in accordance with aspects of this disclosure. The phase diagram 800 is illustrated with phases A through F, which collectively represent a reciprocation cycle. While the reciprocation cycle is illustrated as employing six phases, (i.e., phases A through F) to advance and retract the filler material 104, additional or fewer phases may be include in a reciprocation cycle. For example, the welding circuitry 128a and/or preheat circuitry 128b may further adjust the supplied voltages, current, polarity, etc. during one or more the illustrated phases A through F or during additional phases of a reciprocation cycle.

In operation, the filler material 104 may be advanced and retracted from the weld pool 114 using, for example, the drive roller 107 driven by the electric motor 109. The electric motor 109 may provide real-time (or near real-time) feedback to the control circuitry 122 to indicate whether the filler material 104 is presently advanced to, retracted from, or moving relative to the weld pool 114. In some examples, the control circuitry 122 can, in turn, adjust the asynchronous switching of the welding-type power 602 and preheat power 604 via the welding circuitry 128a and/or preheat circuitry 128b based on the feedback from the electric motor 109. For example, the control circuitry 122 may be configured to switch the welding circuitry 128a and the preheat circuitry 128b between power levels asynchronously during the welding operation via one or more switches.

The process starts at phase A upon initiating a welding operation and proceeds through phases A through F to complete a reciprocation cycle before returning to phase A to start another reciprocation cycle. In one example, the welding operation may be initiated and concluded via, for example, a foot pedal 121 or another switch, button, or trigger. In another example, the welding operation may be initiated and concluded automatically via, for example, control circuitry 122 (e.g., as part of a robotic system). In some example, the reciprocation cycles continue until the welding operation is concluded. The welding system 100 may implement the reciprocation technique at a frequency of 5 to 100 reciprocation cycles per second (i.e., 5-100 Hz), or about 15 to 25 reciprocation cycles per second (i.e., 15-25 Hz).

At phase A, the filler material 104 is stationary relative to the weld pool 114 and positioned above the weld pool 114 (e.g., top dead center). During phase A, the welding circuitry 128a sets the welding-type power at a high welding power level 602a to form (or maintain) the welding arc 138 and the preheat circuitry 128b sets the preheat power 604 in the low preheat power level 604b. As noted above, the preheat power 604 may be entirely off or at a background power level during low preheat power level 604b. For example, when the welding operation is initiated and the first reciprocation cycle starts, the welding arc 138 may be formed upon, for example, actuating the foot pedal 121. If the welding operation is already in process and the welding operation is cycling back to a subsequent reciprocation cycle from phase F, the welding arc 138 is already formed, At phase B, the filler material 104 begins to advance toward the weld pool 114. During phase B, the welding circuitry 128a maintains the welding-type power at the high welding power level 602a to maintain the welding arc 138 and the preheat circuitry 128b maintains the preheat power 604 in the low preheat power level 604b.

At phase C, the filler material 104 continues to advance toward the weld pool 114 and ultimately shorts to the welding work piece 108 (e.g., the filler material 104 electrically contacts the welding work piece 108 via the weld pool 114). During phase C, the welding circuitry 128a transitions the welding-type power from the high welding power level 602a to a low welding power level 602b such that the welding arc 138 is at background. The preheat circuitry 128b transitions the preheat power 604 from the low preheat power level 604b to a high preheat power level 604a to heat the filler material 104. For example, the preheat circuitry 128b may increase, or begin to supply, the preheat power 604.

At phase D, the filler material 104 is stationary relative to the weld pool 114 and positioned below the electrode 144 (e.g., bottom dead center). During phase D, the welding circuitry 128a maintains the welding-type power at the low welding power level 602b to maintain the background arc and the preheat circuitry 128b transitions the preheat power 604 from the high preheat power level 604a to the low preheat power level 604b. For example, the preheat circuitry 128b may decrease, or cease to supply, the preheat power 604.

At phase E, the filler material 104 begins to retract from the weld pool 114 but remains shorted to the welding work piece 108. During phase E, the welding circuitry 128a maintains the welding-type power at the low welding power level 602b and the preheat circuitry 128b maintains the preheat power 604 in the low preheat power level 604b.

At phase F, the filler material 104 continues to retract from the weld pool 114 and ultimately breaks the short to the welding work piece 108 (e.g., the filler material 104 electrically disconnects from the welding work piece 108 via the weld pool 114). During phase F, the welding circuitry 128a transitions the welding-type power from the low welding power level 602b to the high welding power level 602a and the preheat circuitry 128b maintains the preheat power 604 in the low preheat power level 604b. The reciprocation process then returns to phase A of the phase diagram 800 to start a subsequent reciprocation cycle until the welding operation is complete (e.g., by disengaging the foot pedal 121).

In one example, the welding system 100 may be configured to eliminate effects of arc blow in a GTAW operation using a reciprocation technique, The welding system 100 includes, for example, welding circuitry 128a, preheat circuitry 128b, and control circuitry 122 operably coupled to the welding circuitry 128a, the preheat circuitry 128b, and the drive roller 107. The welding circuitry 128a may be configured to provide welding-type power 602 to an electrode 144 of a welding torch 118 during a welding operation. The preheat circuitry 128b may be configured to provide preheat power 604 to heat a filler material 104. The drive roller 107 is configured to advance and retract the filler material 104 relative to a welding work piece 108 during a welding operation. In operation, the control circuitry 122 may be configured to perform a reciprocation cycle that comprises the steps of: providing the welding-type power 602 at a first welding power level 602a to generate a welding arc 138 between a welding work piece 108 and the electrode 144 to form a weld pool 114, wherein the welding circuitry 128a is configured to alternate the welding-type power 602 between the first welding power level 602a and a second welding power level 602b that is lower in power than the first welding power level 602a; advancing, via the drive roller 107, the filler material 104 toward the welding work piece 108 until the filler material 104 is electrically connected to the weld pool 114, wherein the welding circuitry 128a is configured to switch the welding-type power 602 to the second welding power level 602b before the filler material 104 is electrically connected to the weld pool 114; supplying the preheat power 604, via the preheat circuitry 128b, to heat the filler material 104 while the filler material 104 is electrically connected to the weld pool 114; retracting, via the drive roller 107, the filler material 104 away from the welding work piece 108 until the filler material 104 is not electrically connected to the weld pool 114, wherein the welding circuitry 128a is configured to switch the welding-type power 602 to the first welding power level 602a when the filler material 104 is no longer electrically connected to the weld pool 114; and terminating supply of the preheat power 604, via the preheat circuitry 128b, to the filler material 104 while the filler material 104 is not electrically connected to the weld pool 114.

FIG. 9 is a flow diagram of an example reciprocation method. More specifically, a method 900 of preheating a filler material 104 in welding system 100 to eliminate effects of arc blow during a welding operation. The method 900 starts at step 902 upon starting a welding operation by, for example, actuating the foot pedal, trigger, or other operator device. At step 904, the drive roller 107 advances a filler material 104 toward a welding work piece 108 until the filler material 104 is electrically connected to a weld pool 114 formed on the welding work piece 108 during a welding operation. At step 906, the preheat circuitry 128b supplies a preheat power 604 to heat the filler material 104 while the filler material 104 is electrically connected to the weld pool 114. At step 908, the drive roller 107 retracts the filler material 104 away from the welding work piece 108 until the filler material 104 is not electrically connected to the weld pool 114. At step 910, the preheat circuitry 128b terminates supply of the preheat power 604 the to the filler material 104 while the filler material 104 is not electrically connected to the weld pool 114. At step 912, the control circuitry 122 determines whether the welding operation is terminated. The welding operation may be terminated by, for example, releasing the foot pedal, trigger, or other operator device. It the welding operation is terminated step 912, the method ends at step 914, otherwise, the method 900 returns to step 904 to repeat the process.

While the example methods and apparatus disclosed above provide an energy source for wire preheating and an energy source for a welding arc, other example methods and apparatus may include additional and/or different sources of process energy, such as one or more lasers, additional preheated wire with corresponding preheat energy (e.g., resistively heated, inductively heated, etc.), additional arcs with corresponding arc energy, and/or any other sources of energy.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system to eliminate effects of arc blow, the welding system comprising:
    welding circuitry configured to provide welding-type power to an electrode of a welding torch to generate a welding arc between a welding work piece and the electrode to form a weld pool during a welding operation;
    preheat circuitry configured to provide preheat power to heat a filler material;
    a wire-feeding mechanism configured to advance and retract the filler material relative to the welding work piece during the welding operation; and
    control circuitry operably coupled to the welding circuitry, the preheat circuitry, and the wire-feeding mechanism, wherein the control circuitry is configured to perform a reciprocation cycle that comprises:
        advancing, via the wire-feeding mechanism, the filler material toward the welding work piece until the filler material is electrically connected to the weld pool;
        supplying the preheat power, via the preheat circuitry, to heat the filler material while the filler material is electrically connected to the weld pool;
        retracting, via the wire-feeding mechanism, the filler material away from the welding work piece until the filler material is not electrically connected to the weld pool;
        prior to generation of the welding arc, terminating supply of the preheat power, via the preheat circuitry, to the filler material while the filler material is not electrically connected to the weld pool; and
        after terminating supply of the preheat power, supplying the welding-type power, via the welding circuitry, to generate the welding arc between a welding work piece and the electrode to form the weld pool.

2. The welding system of claim 1, wherein the welding circuitry is configured to alternate the welding-type power between a first welding power level and a second welding power level that is lower in power than the first welding power level.

3. The welding system of claim 2, wherein the welding circuitry is configured to supply the welding-type power at the first welding power level while the filler material is not electrically connected to the weld pool.

4. The welding system of claim 3, wherein the welding circuitry is configured to supply the welding-type power at the second welding power level while the filler material is electrically connected to the weld pool.

5. The welding system of claim 2, wherein the welding-type power provided in the first welding power level is at least ten times greater than that provided in the second welding power level.

6. The welding system of claim 1, wherein the control circuitry is configured to perform the reciprocation cycle at a frequency of 5 to 100 reciprocation cycles per second.

7. The welding system of claim 1, wherein the control circuitry is configured to perform the reciprocation cycle at a frequency of 15 to 25 reciprocation cycles per second.

8. The welding system of claim 1, wherein the control circuitry is configured to switch the welding circuitry and the preheat circuitry between power levels asynchronously during the welding operation.

9. The welding system of claim 1, wherein the preheat power is direct current (DC).

10. The welding system of claim 1, wherein the preheat power is alternating current (AC).

11. The welding system of claim 1, wherein the electrode comprises tungsten.

12. The welding system of claim 1, wherein the welding operation is a gas tungsten arc welding (GTAW) operation.

13. The welding system of claim 1, wherein the reciprocation cycle further comprises:
    alternating the welding-type power from a first welding power level to a second welding power level that is lower in power than the first welding power level;

a second advancing step of advancing, via the wire-feeding mechanism, the filler material toward the welding work piece until the filler material is electrically connected to the weld pool;

a second supplying step of supplying the preheat power, via the preheat circuitry, to heat the filler material while the filler material is electrically connected to the weld pool;

a second retracting step of retracting, via the wire-feeding mechanism, the filler material away from the welding work piece until the filler material is not electrically connected to the weld pool; and a second terminating step of terminating supply of the preheat power, via the preheat circuitry, to the filler material while the filler material is not electrically connected to the weld pool.

14. A welding system to eliminate effects of arc blow, the welding system comprising:

welding circuitry configured to provide welding-type power to an electrode of a welding torch during a welding operation;

preheat circuitry configured to provide preheat power to heat a filler material;

a wire-feeding mechanism configured to advance and retract the filler material relative to a welding work piece during a welding operation; and control circuitry operably coupled to the welding circuitry, the preheat circuitry, and the wire-feeding mechanism, wherein the control circuitry is configured to perform a reciprocation cycle that comprises the steps of:

providing the welding-type power at a first welding power level to generate a welding arc between a welding work piece and the electrode to form a weld pool, wherein the welding circuitry is configured to alternate the welding-type power between the first welding power level and a second welding power level that is lower in power than the first welding power level;

advancing, via the wire-feeding mechanism, the filler material toward the welding work piece until the filler material is electrically connected to the weld pool, wherein the welding circuitry is configured to switch the welding-type power to the second welding power level before the filler material is electrically connected to the weld pool;

supplying the preheat power, via the preheat circuitry, to heat the filler material while the filler material is electrically connected to the weld pool;

retracting, via the wire-feeding mechanism, the filler material away from the welding work piece until the filler material is not electrically connected to the weld pool, wherein the welding circuitry is configured to switch the welding-type power to the first welding power level when the filler material is no longer electrically connected to the weld pool; and terminating supply of the preheat power, via the preheat circuitry, to the filler material while the filler material is not electrically connected to the weld pool.

15. The welding system of claim 14, wherein the welding operation is a gas tungsten arc welding (GTAW) operation.

* * * * *